May 25, 1965 L. T. BURDENO 3,185,484

INDEX ROTOR WITH PLURAL HEADS FOR MAGNETIC TAPE RECORDERS

Filed July 20, 1962

INVENTOR.
LAWRENCE T. BURDENO
BY
Donnelly, Mentag & Harrington
ATTORNEYS

United States Patent Office 3,185,484
Patented May 25, 1965

3,185,484
INDEX ROTOR WITH PLURAL HEADS FOR MAGNETIC TAPE RECORDERS

Lawrence T. Burdeno, Dearborn Township, Wayne County, Mich., assignor by court order to Ramona B. Moore Filed July 20, 1962, Ser. No. 211,186
2 Claims. (Cl. 274—4)

This invention relates generally to improvements in magnetic tape sound recording and reproducing apparatus, and more particularly to a novel index rotor provided with a plurality of recorder heads and adapted to be rotated to various positions to bring one or more of the recorder heads into operative engagement with the recording tape or to remove all of the recorder heads from engagement with the tape.

In the prior art conventional type of magnetic sound recording and reproducing apparatus it is customary to mount the various recorder heads or transducers in a more or less fixed position relative to the path of the recording tape. The locating of the recorder heads in a fixed position relative to the recording tape results in unnecessary wear of the recorder heads when they are not being used but yet are engaged by the tape due to the particular selected mode of operation. For example, in a conventional recorder the erase head and the record head are disposed so as to contact the moving tape when the recorder is being used to reproduce previously recorded material, whereby the erase head and the record head are subjected to unnecessary wear during a major portion of the operating life of the recording machine. Accordingly, it is an important object of the present invention to provide an index rotor adapted to contain the various recorder heads used in a recording apparatus and in which the rotor is constructed and arranged so that the operator may selectively position the rotor to present one or more of the heads to the moving tape in accordance with the particular mode of operation. The index rotor is also adapted to be moved to a position whereby none of the recorder heads are engaged by the moving tape whereby the tape may be moved rapidly forwardly or backwardly as desired. When the recorder heads are all removed from the path of the recording tape, the heads may be easily inspected and cleaned and unnecessary wear will be prevented when the tape is being moved rapidly forwardly or backwardly.

It is another object of the present invention to provide a novel and improved index rotor for a recording machine and which is adapted to carry a plurality of recorder heads including an erase head, a record head and a playback head. The index rotor is adapted to be moved to a position where at least one of the recorder heads is in operative engagement with the tape as, for example, where only the play-back head is in operative engagement with the tape whereby accidental erasure of the tape is prevented and wear on the erase and record heads is reduced.

It is another object of the present invention to provide a novel and improved index rotor for a recording machine which is adapted to carry a plurality of recorder heads and which is simple and compact in construction, economical of manufacture and efficient in operation.

Other objects, features and advantages of this invention will be apparent from the following detailed description and appended claims, reference being had to the accompanying drawing forming a part of the specification wherein like reference numerals designate corresponding parts of the several views.

Figure 6:
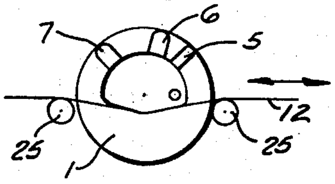
Figures 3, 4, 5:
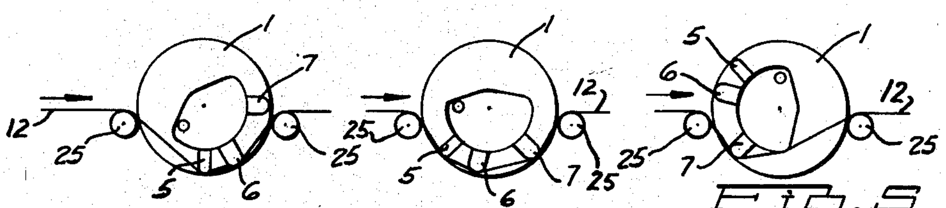
FIG. 3 is a schematic plan view of the index rotor of the present invention, showing the rotor in a first position, with the erasing and recording heads in operative engagement with a magnetic recording tape.
FIG. 4 is a schematic plan view of the index rotor of the present invention, showing the rotor in a second position, with the erasing, recording and monitoring heads in operative engagement with a magnetic recording tape.

FIG. 5 is a schematic plan view of the index rotor of the present invention, showing the rotor in a third position, with the play-back head in operative engagement with a magnetic recording tape; and, FIG. 6 is a schematic plan view of the index rotor of the present invention, showing the rotor in a fourth position to provide for rapid travel of the tape in either the forward direction or the reverse direction, with none of the heads on the rotor in engagement with the tape.

Figure 1:
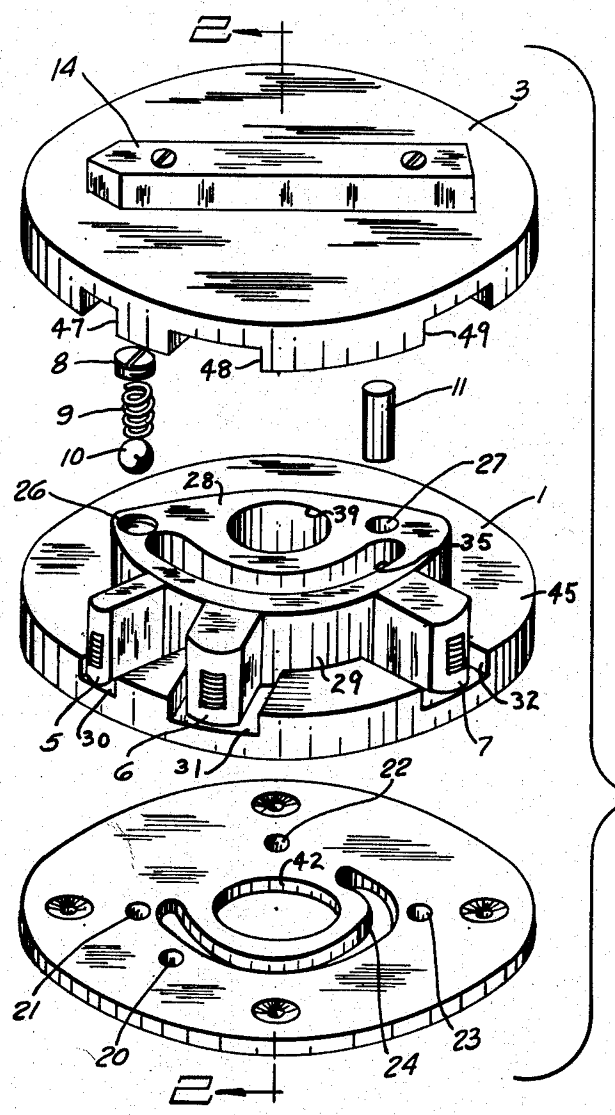
FIG. 1 is an exploded perspective view of an index rotor provided with a plurality of heads, and made in accordance with the principles of the present invention.
Figure 2:
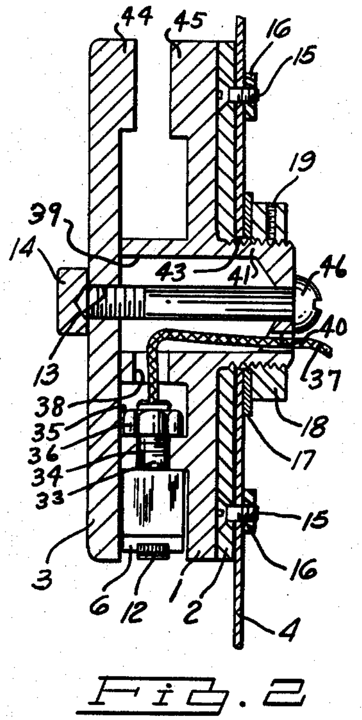
FIG. 2 is an elevational sectional view of the structure illustrated in FIG. 1, taken substantially along the line 2—2 thereof, looking in the direction of the arrows, and showing the structure rotated counterclockwise approximately 90 degrees.

Referring now to the drawing and in particular to FIGS. 1 and 2, the index rotor of the present invention is illustrated as comprising the circular body member 1 which is rotatably mounted on the base plate 2 and covered by the cover plate 3. The rotor is adapted to be mounted on the outer panel 4 of a conventional tape recorder which has been modified to use the rotor of the present invention.

As shown in FIG. 1, the index rotor of the present invention is provided with a plurality of operating heads which are indicated by the numerals 5, 6 and 7. The operating heads 5, 6 and 7 are conventional erase, record and play-back heads, respectively. Integrally formed on the upper side of the body member 1 is the upwardly extended sector shaped block 28 which is provided with the outer rounded surface 29 concentric with the outer surface of the circular body 1. As shown in FIG. 1, the heads 5, 6 and 7 are seated in the recesses 30, 31 and 32 which are formed on the upper side of the body member 1.

The heads 5, 6 and 7 are adapted to be fixedly connected to the body member 1 by any suitable means. A suitable means for securing the heads to the body member 1 is illustrated in FIG. 2. In FIG. 2 the record head 6 is shown as provided with an integral mounting bolt 33 which is adapted to be passed through the hole 34 formed in the wall 29 and to extend into the arcuate slot 35 formed through the sector portion 28. A suitable lock nut, as indicated by the numeral 36, is adapted to be mounted on the bolt 33 to hold the record head 6 in place in its respective recess 31.

The heads 5, 6 and 7 are all adapted to be connected to the associated electrical circuits of the recorder by means of the usual flexible lead wires. For example, FIG. 2 shows the record head 6 provided with the usual flexible lead wire 37 which is operatively connected to the record head 6, and which extends rearwardly through the bolt 33, the passage 38 in the sector 28, and thence into the central hole 39. The flexible lead wire 37 thence passes through the hole 40 formed in the inner closed end of the hub 41 which is formed on the lower side of the body member 1.

The base plate 2 is adapted to be fixedly secured to the recorder outer panel 4 by any suitable means, as for example, by a plurality of screws 15 adapted to pass through suitable holes formed in the base plate 2 and the panel 4 and secured in place by means of the lock nuts 16. As shown in FIG. 2, the body member 1 is rotatably mounted on the plate 2 by means of the hub 41 being extended downwardly through the central hole 42 in the plate 2 and thence through the recorder panel hole 43. The body member 1 is held against the plate 2 in rotatable engagement therewith by means of the nut 18 which is threadably mounted on the outer side of the hub 41 and secured in fixed relation to the hub by means of the lock screw 19. A suitable bearing washer 17 is mounted between the panel 4 and the nut 18.

The body member 1 and the cover 3 are made from any suitable material, as for example, aluminum, Bakelite or the like. The cover 3 is circular and is provided on the lower side thereof with the flange 44 which is aligned with the flange 45 on the upper face of the body 1 to provide a guide means for the magnetic recording tape 12. The cover plate 3 is adapted to be seated on the upper surface of the sector portion 28 and to be secured thereto by means of the bolt 46 which passes through the end wall of the hub 41 and which threadably engages the inner side of the cover 3. The numeral 13 indicates the threaded hole in the cover 3 into which the mounting bolt 46 is threaded. The cover 3 is provided with the recesses 47, 48 and 49 in the flange 44 and these recesses receive the upper ends of the heads 5, 6 and 7. The cover 3 is provided with the elongated knob 14 for turning the rotor, as more fully described hereinafter.

The indexing of the body member 1 is controlled by the detent ball 10 which is mounted in the hole 26 in the body 1 and is adapted to be successively engaged in the detent holes 20, 21, 22 and 23 as the body member 1 is rotated clockwise over the plate 2, as viewed in FIG. 1. The detent ball 10 is provided with a downward bias by means of the spring 9 which is mounted in the hole 26 above the ball 10 and held therein by means of the threaded plug 8. Rotation of the body member 1 over the plate 2 is controlled by means of the pin 11 which is pressed into the hole 27 and which extends downwardly from the body 1 and into the arcuate slot 24 formed in the base plate 2. The slot 24 extends for a travel of approximately 225 degrees.

It will be understood that when the index rotor of the present invention is turned to the various positions shown in FIGS. 3, 4, 5 and 6, that the recorder electrical circuitry would be switched accordingly by any suitable means. The controls for switching the circuitry to the proper positions do not form any part of this invention and, accordingly, are not shown. When the housing for rotor 1 is turned to the position shown in FIG. 3, the detent ball 10 will be in the hole 20 and the erase head 5 and the record head 6 will contact the tape 12 for recording without monitoring. When the body member 1 has been moved to the position shown in FIG. 4, the detent ball will be in the hole 21 and the tape 12 engages all three of the heads 5, 6 and 7 for recording with monitoring action. When the body 1 has been turned to the position shown in FIG. 5, the detent ball 10 will be in the detent hole 22 and the erase head 5 and record head 6 will be removed from the path of the tape 12 to provide for play-back action only. The position of FIG. 5 prevents accidental erasure of the tape 12 and wear on the erase and record heads. When the body 1 has been rotated to the position in FIG. 6, the detent ball will be in the detent hole 23 and all of the heads 5, 6 and 7 will be removed from the path of the tape 12 to provide for rapid travel of the tape in forward or reverse directions.

The numerals 25 in FIGS. 3, 4, 5 and 6 indicate conventional tape guides.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. In a tape recording apparatus provided with a movable tape, an index rotor comprising: a base plate; a body swingably mounted on said plate adjacent said tape; a plurality of recorder heads on said body, including an erase head, a record head and a play-back head; means for selectively swinging said body to various indexed positions for moving at least one of said heads into operative engagement with the tape, and out of engagement therewith; and, detent means for releasably retaining said body in said indexed positions.

2. In a tape recording apparatus provided with a movable tape, an index rotor comprising: a base plate; a body swingably mounted on said plate adjacent said tape; a plurality of spaced apart, radially disposed recorder heads on said body, including an erase head, a record head and a playback head; a cover on said body; tape guide means formed on said cover and body; manually operable means for selectively swinging said body to various indexed positions for moving at least one of said heads into operative engagement therewith; and detent means for releasably retaining said body in said indexed positions.

References Cited by the Examiner

UNITED STATES PATENTS

| | | | |
|---|---|---|---|
| 2,540,406 | 2/51 | Ranger | 179—100.2 |
| 2,793,253 | 5/51 | Howey | 179—100.2 |

NORTON ANSHER, *Primary Examiner.*

EMIL G. ANDERSON, *Examiner.*